United States Patent
Culbertson et al.

(10) Patent No.: US 11,268,473 B2
(45) Date of Patent: Mar. 8, 2022

(54) SYSTEMS AND METHODS FOR REDUCING RELEASE OF UNDESIRED EVAPORATIVE EMISSIONS IN PLUG-IN HYBRID ELECTRIC VEHICLES

(71) Applicant: Ford Global Technologies, LLC, Dearborn, MI (US)

(72) Inventors: Tom Raymond Culbertson, Livonia, MI (US); Kenneth L. Pifher, Taylor, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 16/694,821

(22) Filed: Nov. 25, 2019

(65) Prior Publication Data
US 2021/0156331 A1   May 27, 2021

(51) Int. Cl.
*F02D 41/30* (2006.01)
*G05D 1/02* (2020.01)
(Continued)

(52) U.S. Cl.
CPC ......... *F02D 41/3082* (2013.01); *B60W 20/10* (2013.01); *F02D 41/3076* (2013.01); *G05D 1/021* (2013.01); *B60W 50/08* (2013.01)

(58) Field of Classification Search
CPC ..... B60W 20/10; B60W 50/08; F02D 41/003; F02D 41/042; F02D 41/062;
(Continued)

(56) References Cited

U.S. PATENT DOCUMENTS 5,685,268 A    11/1997  Wakemen
7,117,849 B1 * 10/2006  Reatherford ....... F02M 21/0206
                                                   123/467
(Continued)

FOREIGN PATENT DOCUMENTS

JP    2016166002 A    9/2016

OTHER PUBLICATIONS

Pursifull, R., "Fuel Rail Pressure Relief," SAE International, SAE International Technical Paper 2006-01-0626, Available Online at https://saemobilus.sae.org/content/2006-01-0626/, Apr. 3, 2006, 11 pages.

*Primary Examiner* — Phutthiwat Wongwian
*Assistant Examiner* — Arnold Castro
(74) *Attorney, Agent, or Firm* — Geoffrey Brumbaugh; McCoy Russell LLP

(57) ABSTRACT

Methods and systems are provided for reducing a potential for release of undesired evaporative emissions to atmosphere for vehicles that rely primarily on an electric-only mode of operation for vehicle propulsion. In one example, a method may include in response to a vehicle-on request via a driver of a vehicle, maintaining off a fuel pump that supplies a fuel to a set of port fuel injectors, and re-pressurizing the set of port fuel injectors via operation of the fuel pump based on a predicted engine-start request during a drive cycle following the vehicle-on request. In this way, escape of fuel from pressurized port fuel injectors may be reduced or avoided during engine-off conditions, which may reduce opportunity for release of undesired evaporative emissions to atmosphere.

20 Claims, 6 Drawing Sheets

(51) Int. Cl.
*B60W 20/10* (2016.01)
*B60W 50/08* (2020.01)

(58) Field of Classification Search
CPC ............ F02D 41/3076; F02D 41/3082; F02D 41/3094; F02D 41/3845; F02D 2200/60; F02M 25/08; F02N 11/08; F02N 11/0829; G05D 1/021; Y02T 90/14
See application file for complete search history.

(56) References Cited

U.S. PATENT DOCUMENTS

| | | | |
|---|---|---|---|
| 7,444,990 B1 * | 11/2008 | Fisher | F02D 33/006 123/459 |
| 8,326,479 B2 | 12/2012 | Martin et al. | |
| 9,580,062 B2 | 2/2017 | Perkins et al. | |
| 9,688,270 B2 | 6/2017 | Amin | |
| 9,856,830 B2 | 1/2018 | Dudar | |
| 10,072,600 B1 * | 9/2018 | Ulrey | F02D 41/3094 |
| 10,174,704 B2 | 1/2019 | Yang et al. | |
| 2003/0221675 A1 * | 12/2003 | Washeleski | F02M 25/089 123/497 |
| 2004/0250795 A1 * | 12/2004 | Stroia | F02M 37/0047 123/447 |
| 2007/0144489 A1 * | 6/2007 | Fischer | F02M 37/106 123/457 |
| 2017/0198671 A1 * | 7/2017 | Dudar | F02M 35/10019 |
| 2018/0029589 A1 | 2/2018 | Dextreit et al. | |
| 2018/0171948 A1 * | 6/2018 | McClelland | B01D 46/0049 |
| 2019/0271288 A1 * | 9/2019 | Asai | F02D 41/3082 |
| 2020/0129912 A1 * | 4/2020 | Williams | B01D 53/02 |
| 2020/0172088 A1 * | 6/2020 | Dudar | B60W 30/06 |
| 2021/0237534 A1 * | 8/2021 | Badger, II | H04L 67/125 |

* cited by examiner

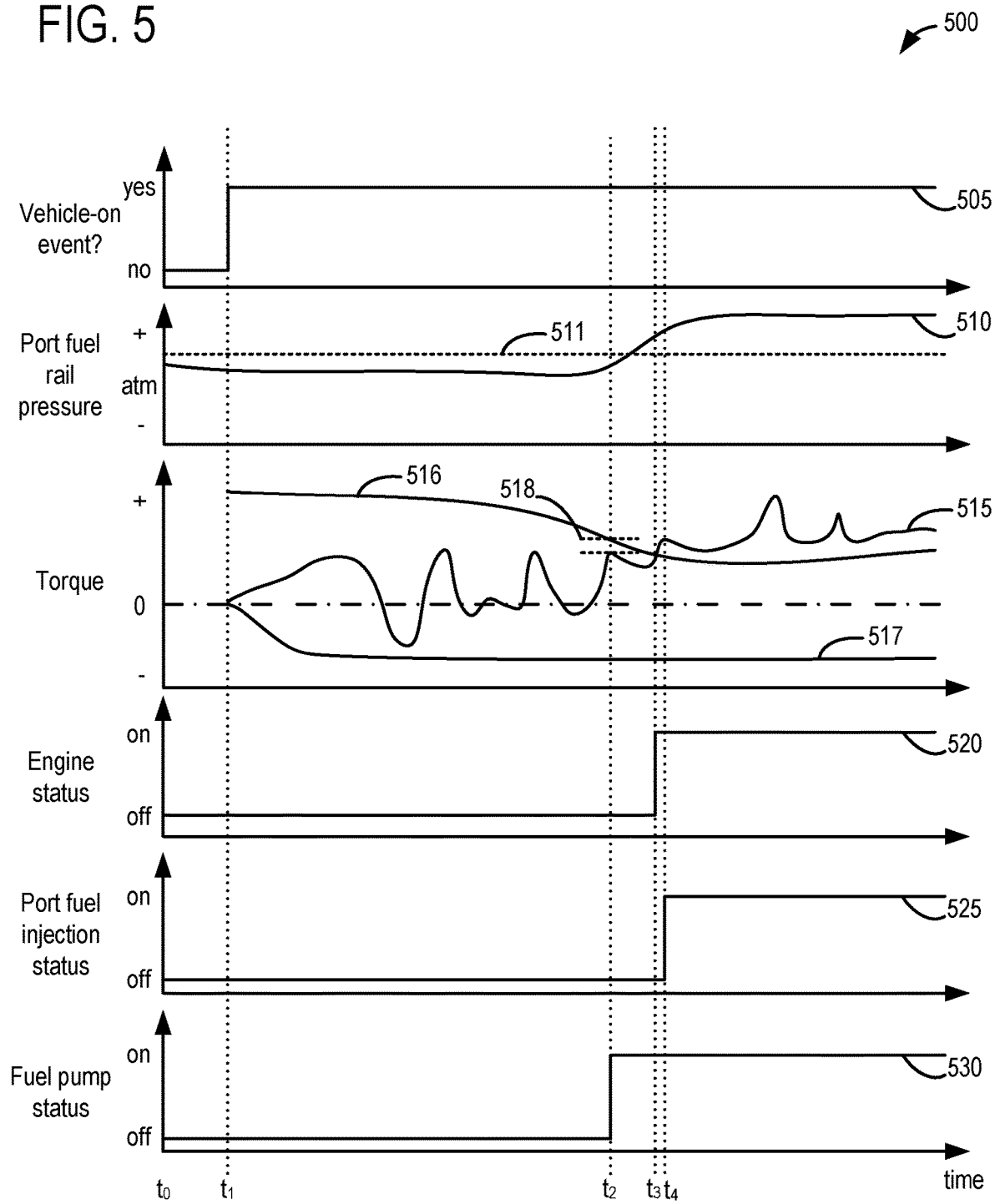

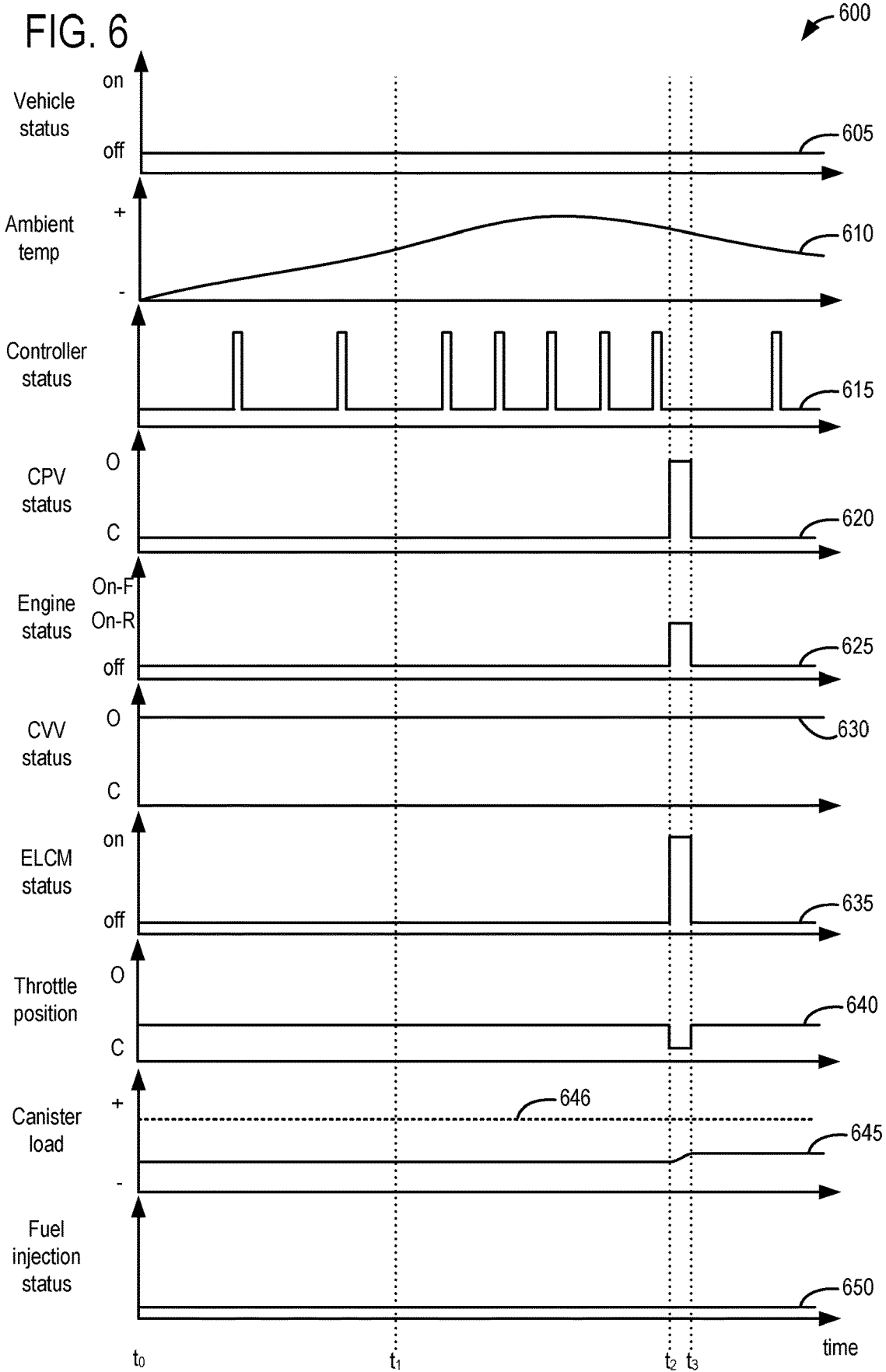

SYSTEMS AND METHODS FOR REDUCING RELEASE OF UNDESIRED EVAPORATIVE EMISSIONS IN PLUG-IN HYBRID ELECTRIC VEHICLES

FIELD

The present description relates generally to methods and systems for controlling a fuel pump to re-pressurize port fuel injectors as a function of onboard energy storage and driver demand.

BACKGROUND/SUMMARY

Plug-in hybrid electric vehicles (PHEVs) are an extension of existing hybrid electric vehicle (HEV) technology, in which a gasoline engine is supplemented by an electric battery pack and one or more electric machine(s) to gain increased mileage and reduced vehicle emissions. A PHEV utilizes a larger capacity battery pack than a standard HEV and it adds capability of recharging the battery from a standard electrical outlet. Because the battery pack has a larger capacity, a PHEV can be operated primarily by electric propulsion for a substantial distance as compared to HEVs. Specifically, the engine in a PHEV is started to assist vehicle propulsion in limited circumstances such as high speed and/or high torque demand operations. Once the battery of a PHEV cannot meet driver demand, the engine may be commanded to take over the primary role in vehicle propulsion.

While a PHEV may operate based solely on battery power for extended time periods, fuel injectors that provide fuel to the engine may be re-pressurized at each vehicle-activation event (e.g., key on event). The fuel injectors may be configured for direct injection or port injection. When port injection and direct injection fuel injectors are re-pressurized, the injectors may allow a small, but measurable amount of fuel to escape the particular fuel injector. It is herein recognized that such leakage of fuel, particular with regard to the port fuel injector, may result in release of undesired evaporative emissions for PHEVs as the vehicle is operated in electric-only mode for extended time periods. For example, undesired evaporative emissions may escape to atmosphere via an air intake passage of a PHEV engine because the engine remains off for extended time periods. Such a similar situation may be substantially reduced or avoided for HEVs due to the fact that HEVs rely on engine operation soon after fuel injector re-pressurization, which may route any uncombusted fuel in the intake to the engine and exhaust system.

In "Fuel Rail Pressure Relief", Visteon Corporation, Society of Automotive Engineers, SAE 2006-01-0626, it is disclosed that a major source of engine-off evaporative emissions may be fuel injector leakage. Therein, systems and methods are provided for fuel system pressure relief after key-off, so as to reduce or avoid the release of undesired evaporative emissions to atmosphere. However, the inventors herein have recognized potential issues with such systems and methods. In particular, there is no disclosure of how to avoid release of undesired evaporative emissions stemming from port fuel injectors associated with a PHEV engine, where the vehicle may be operated without engine operation for extended durations.

The inventors herein have recognized the above-mentioned issues, and have developed systems and methods to at least partially address them. In one example, a method comprises in response to a vehicle-on request via a driver of a vehicle, maintaining off a fuel pump that supplies a fuel to a fuel rail that in turn supplies the fuel to a set of fuel injectors for providing the fuel to an engine, and commanding on the fuel pump based on a predicted engine-start request during a drive cycle following the vehicle-on request.

As one example of the method, the predicted engine-start request may be based on driver demand. Additionally, the predicted engine-start request may be based on an available amount of a motor torque contributable via a motor that is used to propel the vehicle in an absence of operation of the engine. The driver may in some examples be an autonomous driver. The set of fuel injectors may be port fuel injectors, and the vehicle may be a plug-in hybrid electric vehicle. The commanding on of the fuel pump may occur prior to an actual engine-start request.

As another example of the method, the method may include maintaining the fuel pump off for an entirety of the drive cycle responsive to an absence of the predicted engine-start request during the drive cycle.

As yet another example of the method, the method may further include learning a set of commonly traveled routes of the vehicle over time including, for each route of the set of commonly traveled routes, an approximate engine-start request time, and wherein the predicted engine-start request is based on the approximate engine-start request time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 illustrates a prophetic example timeline for controlling the fuel pump according to the method of FIG. 3;

FIG. 6 depicts a prophetic example timeline for reducing the potential for release of undesired evaporative emissions to atmosphere during vehicle-off conditions, according to the method of FIG. 4.

DETAILED DESCRIPTION

Figure 1:
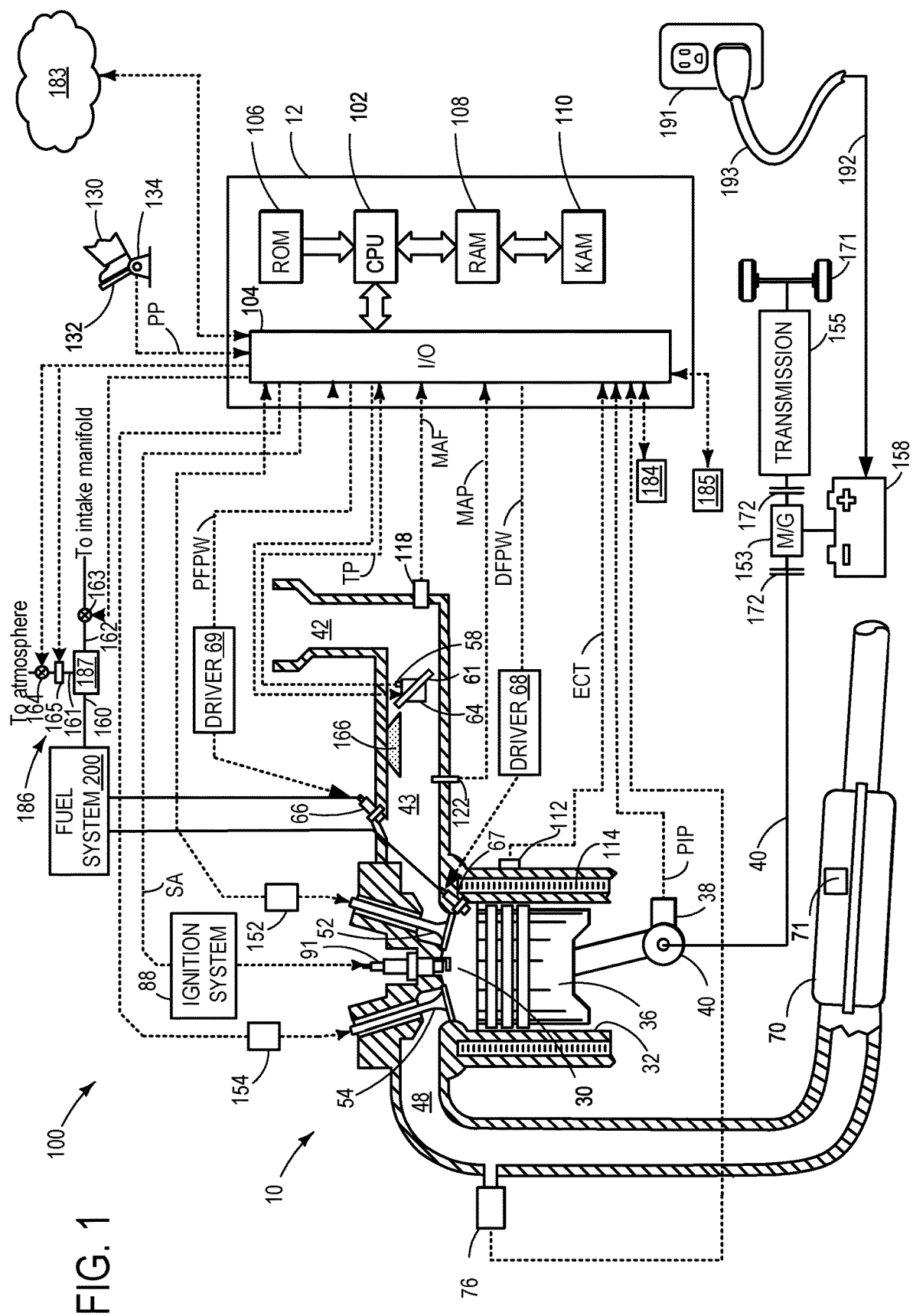
FIG. 1 shows a schematic depiction of an engine system.
Figure 2:
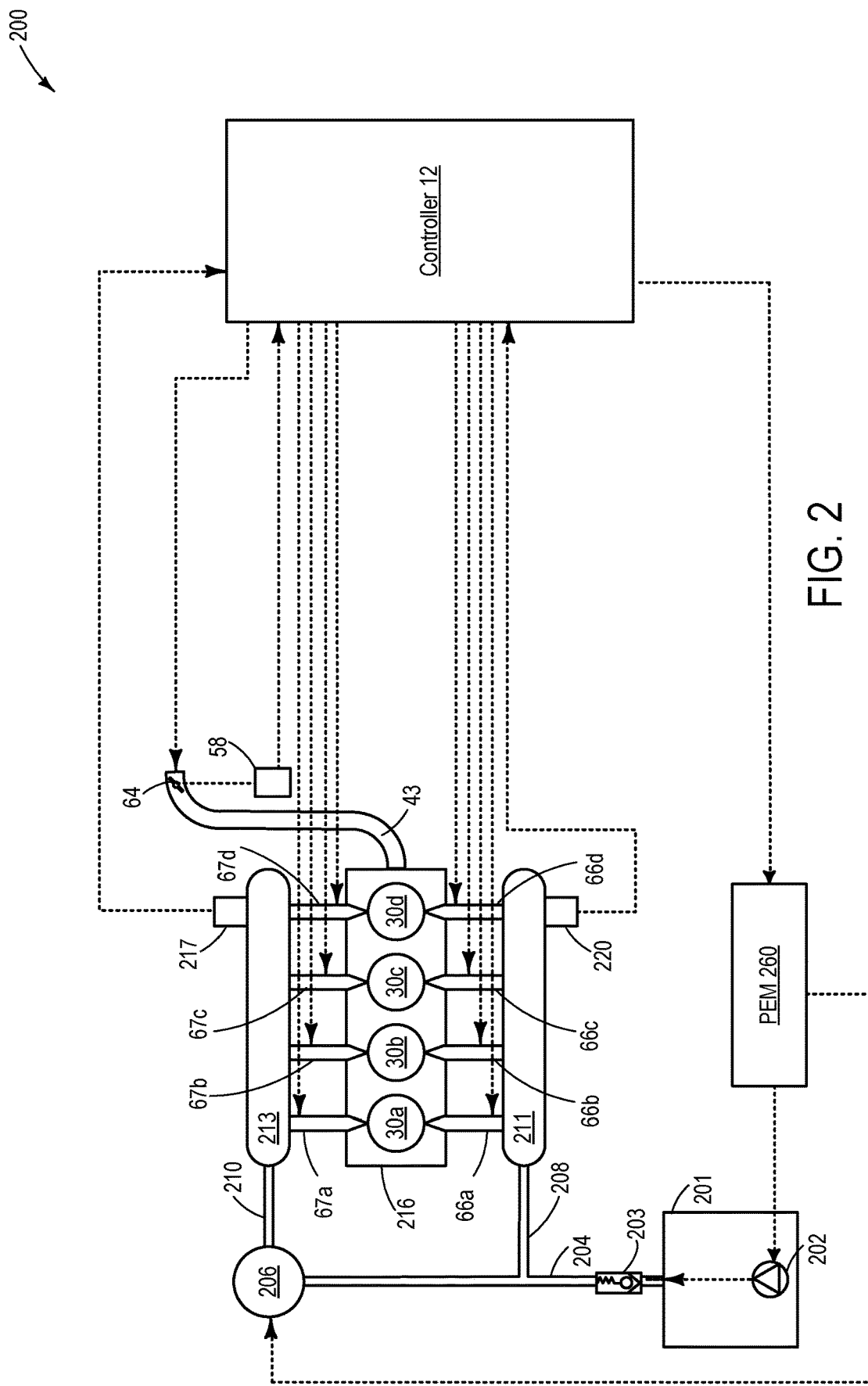
FIG. 2 shows a schematic diagram of a dual injector, single fuel system coupled to the engine system of FIG. 1.
Figure 3:
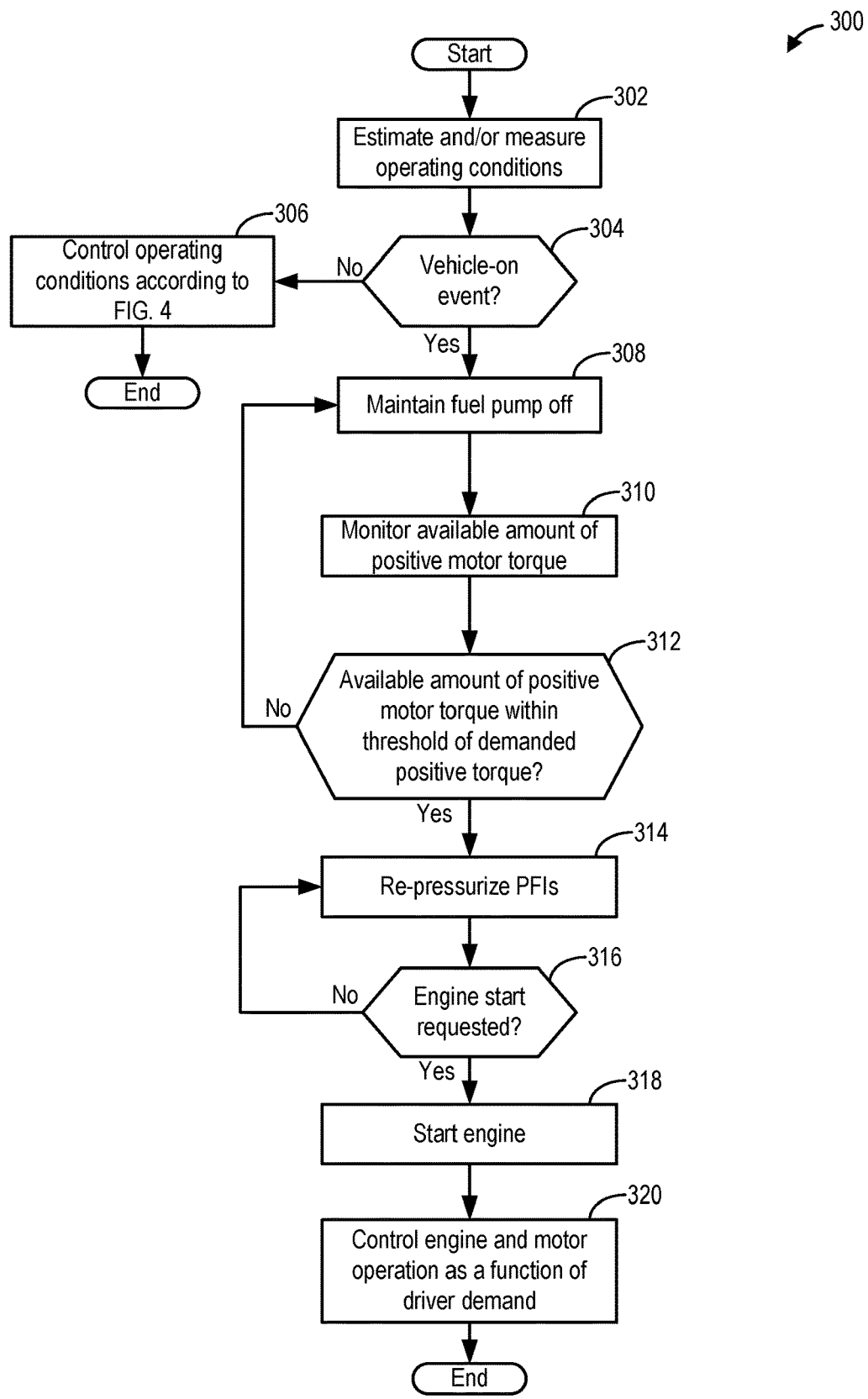
FIG. 3 depicts a high-level example method for controlling a fuel pump in a PHEV responsive to a vehicle startup event.
Figure 4:
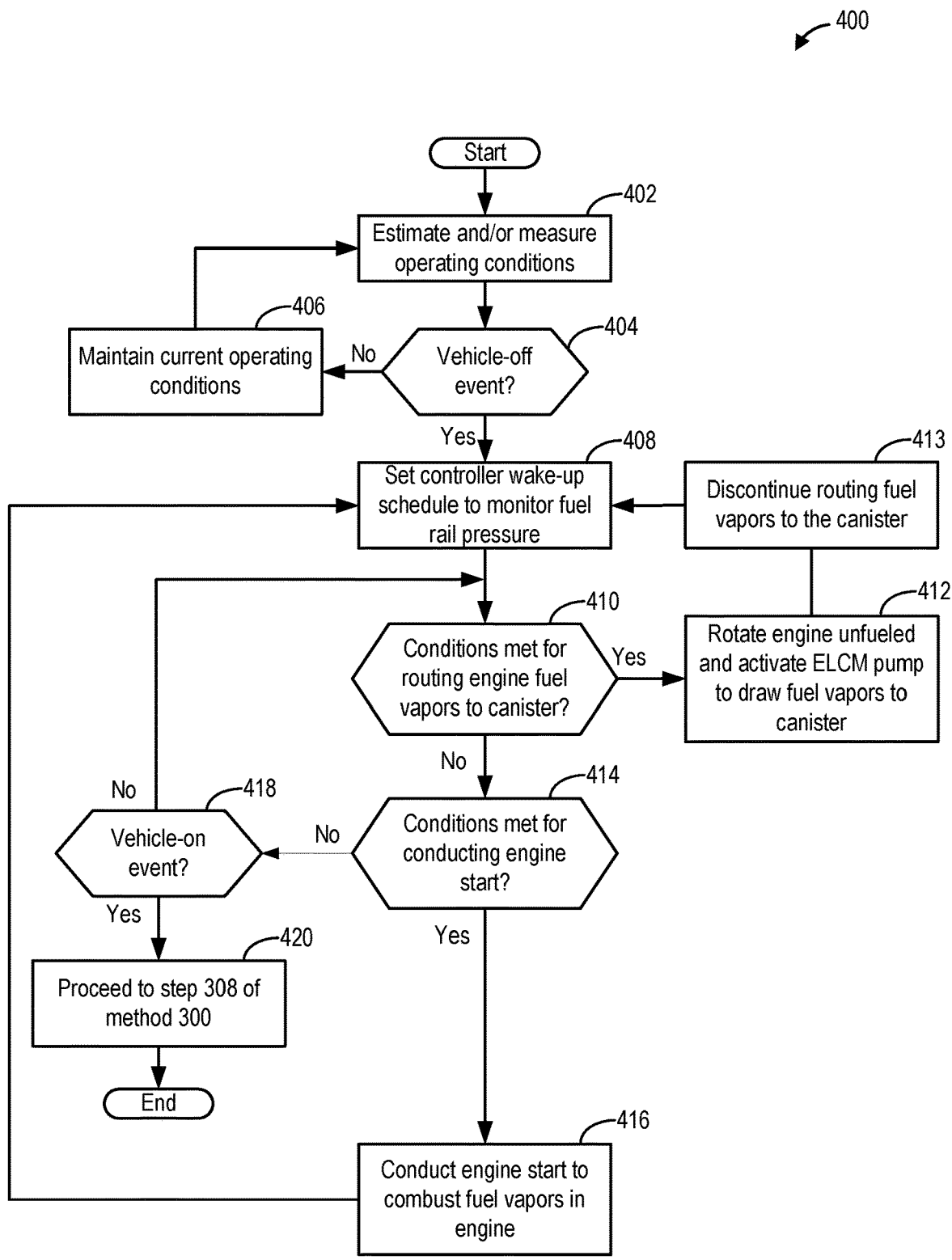
FIG. 4 depicts a high-level example method for reducing a potential for release of undesired evaporative emissions to atmosphere during vehicle-off conditions.

The following description relates to systems and methods for reducing release of undesired evaporative emissions to atmosphere for plug-in hybrid electric vehicles (PHEVs). Accordingly, depicted at FIG. 1 is an example vehicle system of a PHEV. It is herein recognized that PHEVs, in which the vehicle is propelled preferentially via an electric-only mode and where engine operation is requested when driver demand can no longer be met solely via the electric-only mode of operation, may display increased undesired evaporative emissions stemming from fuel escaping from port fuel injector(s) during vehicle-on or off conditions. Accordingly, depicted at FIG. 2 is an example fuel system coupled to at least a fuel rail that supplies fuel to port fuel injector(s). An example method for reducing a potential for release of undesired evaporative emissions to atmosphere responsive to a vehicle-on event for a PHEV is depicted at FIG. 3. Another example method for reducing a potential for release of undesired evaporative emissions to atmosphere responsive to a vehicle-off event for a PHEV is depicted at FIG. 4. FIG. 5 depicts a prophetic example timeline for reducing release of undesired evaporative emissions to atmosphere according to the method of FIG. 3, and FIG. 6 depicts a prophetic example timeline for reducing release of undesired evaporative emissions to atmosphere according to the method of FIG. 4.

FIG. 1 shows a schematic depiction of a spark ignition internal combustion engine 10 included as part of vehicle system 100 with a dual injector fuel system, where engine 10 is configured with both direct fuel injection (DI) and port fuel injection (PFI). However, while FIG. 1 depicts the dual injector fuel system, it may be understood that in other examples a single injector fuel system comprising port fuel injection but not direct fuel injection is within the scope of this disclosure. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown, but which may be the same as electric machine 153 in some examples) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 for delivering injected fuel directly therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a fuel system 200 including a fuel tank, fuel pumps, and fuel rails (elaborated at FIG. 2). Further, as shown in FIG. 2, the fuel tank and rails may each have a pressure transducer providing a signal to controller 12.

Exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example. In some examples, emission control device may include emission control device heater 71, which may be used to raise a temperature of emission control device 70 for ensuring optimal control of emissions and/or other usages as will be discussed in further detail below.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; throttle position TP from throttle position sensor 58; and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft.

As described above, FIG. 1 merely shows one cylinder of a multi-cylinder engine, and it may be understood that each cylinder also has its own set of intake/exhaust valves, fuel injectors, spark plugs, etc. Also, in the example embodiments described herein, the engine may be coupled to a starter motor (not shown, but which may be the same as electric machine 153 discussed in further detail below in some examples) for starting the engine. The starter motor may be powered when the driver turns a key in the ignition switch on the steering column, for example. The starter may be disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

Vehicle system 100 may include multiple sources of torque available to one or more vehicle wheels 171. In the example shown, vehicle system 100 is a plug-in hybrid electric vehicle system (PHEV) that includes an electric machine 153. Electric machine 153 may be a motor or a motor/generator. Crankshaft 40 of engine 10 and electric machine 153 are connected via a transmission 155 to vehicle wheels 171 when one or more clutches 172 are engaged. In the depicted example, a first clutch is provided between crankshaft 40 and electric machine 153, and a second clutch is provided between electric machine 153 and transmission 155. Controller 12 may send a signal to an actuator of each clutch 172 to engage or disengage the clutch, so as to connect or disconnect crankshaft from electric machine 153 and the components connected thereto, and/or connect or disconnect electric machine 153 from transmission 155 and the components connected thereto. Transmission 155 may be a gearbox, a planetary gear system, or another type of transmission. The powertrain may be configured in various manners including as a parallel, a series, or a series-parallel hybrid vehicle.

Electric machine 153 receives electrical power from a traction battery 158 (also described herein as onboard energy storage device, energy storage device, or battery) to provide torque to vehicle wheels 171. Electric machine 153 may also be operated as a generator to provide electrical power to charge traction battery 158, for example during a braking operation.

Onboard energy storage device 158 may periodically receive electrical energy from a power source 191 residing external to the vehicle (e.g., not part of the vehicle) as indicated by arrow 192. As a non-limiting example, vehicle system 100 may be configured as a PHEV, as discussed above, whereby electrical energy may be supplied to energy storage device 158 from power source 191 via an electrical energy transmission cable 193. During a recharging operation of energy storage device 158 from power source 191, electrical transmission cable 193 may electrically couple energy storage device 158 and power source 191. While the vehicle propulsion system is operated to propel the vehicle, electrical transmission cable 193 may disconnected between power source 191 and energy storage device 158. Controller 12 may identify and/or control the amount of electrical energy stored at the energy storage device, which may be referred to as the state of charge (SOC).

In other examples, electrical transmission cable 193 may be omitted, where electrical energy may be received wirelessly at energy storage device 158 from power source 191. For example, energy storage device 158 may receive electrical energy from power source 191 via one or more of electromagnetic induction, radio waves, and electromagnetic resonance. As such, it may be appreciated that any suitable approach may be used for recharging energy storage device 158 from a power source that does not comprise part of the vehicle.

Controller 12 may be communicatively coupled to other vehicles or infrastructures using appropriate communications technology, as is known in the art. For example, controller 12 may be coupled to other vehicles or infrastructures via a wireless network 183, which may comprise Wi-Fi, Bluetooth, a type of cellular service, a wireless data transfer protocol, and so on. Controller 12 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles and/or infrastructure can be either direct between vehicles, or can be multi-hop. In some examples, longer range communications (e.g. WiMax) may be used in place of, or in conjunction with, V2V, or V2I2V, to extend the coverage area by a few miles. In still other examples, controller 12 may be communicatively coupled to other vehicles or infrastructures via wireless network 183 and the internet (e.g. cloud), as is commonly known in the art.

Vehicle system 100 may also include an on-board navigation system 184 (for example, a Global Positioning System) that an operator of the vehicle may interact with. The navigation system 184 may include one or more location sensors for assisting in estimating vehicle speed, vehicle altitude, vehicle position/location, etc. This information may be used to infer engine operating parameters, such as local barometric pressure. As discussed above, controller 12 may further be configured to receive information via the internet or other communication networks. Information received from the GPS may be cross-referenced to information available via the internet to determine local weather conditions including ambient temperature, local vehicle regulations, etc. The navigation system 184 may be further configured to develop routes from the current location to a selected destination, as well as display a map and present driving directions to the selected destination via, for example, a user interface device (not shown). The navigation system may further be configured to be used in conjunction with route learning methodology, to enable an ability of the vehicle system to learn commonly traveled routes, over time.

In some examples, vehicle system 100 may include driving sensors 185, which may include one or more of lasers, radar, sonar, acoustic sensors, camera(s), etc., which may enable vehicle location, traffic information, route information, etc., to be collected via the vehicle.

While not explicitly illustrated, it may be understood that in some examples vehicle system 100 may be autonomously operated in the absence of a vehicle operator, as is commonly understood in the art. In such an example, an autonomous vehicle system controller (not shown) may control engine system operation (and other vehicle system parameters) at least in conjunction with information retrieved from the onboard navigation system and driving sensor(s) mentioned above.

As mentioned, at least the onboard navigation system 184 and/or driving sensor(s) 185 may be used to learn commonly traveled driving routes/routines, which may include a physical route traveled and which may additionally include particular vehicle operating conditions with respect to the learned physical routes traveled. Based on the learning, the controller 12 may be capable of determining which routes are likely to include usage of the engine, and this information may be used in some examples to trigger re-pressurization of PFI(s) 66, which will be discussed in further detail below. The learning may be a function of a particular vehicle operator operating the vehicle, in some examples. The learning may be a function of battery SOC at the initiation of a particular drive cycle. For example, engine operation may be expected sooner in a learned drive cycle when battery SOC is lower, as compared to when battery SOC is higher, for example.

A brief description of how the controller may learn commonly traveled driving routines is now discussed. Specifically, at a vehicle startup event (e.g., vehicle-on event), methodology may include accessing vehicle location, driver information, day of week, time of day, battery SOC, fuel level in the fuel tank, etc. A driver's identity may be input by the driver, or may be inferred based on driving habits, seat position, cabin climate control preferences, voice-activated commands, etc. Vehicle location may be accessed via the onboard navigation system (e.g., GPS), or other means such as via wireless communication with the internet.

During vehicle operation, the learning methodology may include recording vehicle route information, along with information pertaining to driver demand (e.g., driver demanded wheel torque) and positive (and negative) motor torque available. For example, the controller may continuously or regularly collect data from the above-described sensor(s) of the vehicle system, onboard navigation system and/or outside sources (e.g., V2X communications) regarding the vehicle's operations/conditions, location, traffic information, local weather information, etc. Some sensors which have not been discussed above but which may be relevant to the learning may include tire pressure monitoring sensor(s), engine temperature sensor(s), brake heat sensor(s), brake pad status sensor(s), tire tread sensor(s), fuel sensor(s), oil level and quality sensor(s), air quality sensor(s), etc. The controller may in some examples retrieve various types of non-real-time data, for example information from a detailed map, which may be stored at the controller or which may be retrieved wirelessly. Such learned data may be stored at one or more lookup tables (onboard or retrievable over the wireless network), so that the controller may retrieve the information in order to infer an appropriate time t0 initiate fuel injector re-pressurization.

An example of a learned driving routine of the present disclosure is now briefly discussed. A vehicle operator may, for example, charge the battery of a PHEV overnight, so that the battery has a full charge prior to a morning commute. The commute may initially involve substantial travel through a suburb where the vehicle may be propelled solely via the electric machine (e.g., electric machine 153 at FIG. 1). The travel may reduce battery SOC during the suburb travel. At a certain point during the commute, the vehicle operator may demand more torque than is capable of being provided solely via the electric machine, due to battery constraints. For example, the increased driver demand may relate to freeway travel where increased wheel torque is requested by the vehicle operator and/or substantial uphill travel, in another example. The controller may learn that, under situations where the battery has a full charge at the initiation of the driving routine, that engine operation is predicted to be requested at a particular approximate location (e.g., entrance ramp to the freeway). This information may be used in some examples to trigger fuel injector re-pressurization, as will be elaborated in greater detail below.

Fuel system 200 may in some examples be coupled to an evaporative emissions control system 186. Evaporative emissions control system 186 may include a fuel vapor storage canister 187, which may be used to capture and store fuel vapors from fuel system 200. Specifically, fuel vapors from fuel system 200 may be routed to canister 187 via recovery line 160, before being purged to engine intake at a position downstream of throttle 64. Canister 187 may be filled with an appropriate adsorbent, such that the canister may temporarily trap fuel vapors (including vaporized hydrocarbons) during fuel tank refilling operations and "running loss" conditions (e.g., where fuel is vaporized during vehicle operation). In one example, the adsorbent used is activated charcoal. Emissions control system 186 may further include a vent line 161 which may route gases out of canister 187 to the atmosphere when storing, or trapping, fuel vapors from fuel system 200. One or more temperature sensor(s) (not shown) may be coupled to and/or included within canister 187. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within canister 187.

Vent line 161 may also allow fresh air to be drawn into canister 187 when purging stored fuel vapors from fuel system 200 and canister 187 to engine intake via purge line 162 and canister purge valve (CPV) 163. For example, CPV 163 may be normally closed but may be opened during certain conditions so that vacuum from engine intake manifold 43 is provided to fuel vapor canister 187 for purging fuel vapors stored in the canister to engine intake for combustion. In some examples, vent line 161 may include an air filter (not shown) disposed upstream of canister 187.

In some examples, the flow of air and vapors between canister 187 and the atmosphere may be regulated by a canister vent valve (CVV) 164 coupled within vent line 161. For example, the CVV may be opened during fuel vapor storing operations (e.g., during refueling operations), so that air, stripped of fuel vapor after having passed through the canister, can be pushed out to atmosphere. Likewise, during canister purging operations (e.g., during canister regeneration when the engine is running), CVV 164 may be opened to allow a flow of fresh air to strip the fuel vapors stored in the canister. CVV may be a normally open valve in some examples (e.g., latchable in an open configuration).

Furthermore, while not explicitly illustrated at FIG. 1, in some examples a fuel tank isolation valve (FTIV) may be included in recovery line 160 between a fuel tank (e.g., fuel tank 201 at FIG. 2) and canister 187. The FTIV may be a normally closed valve, that when opened, allows for the venting of fuel vapors from the fuel tank to canister 187. It may be understood that each of CPV 163, FTIV (not shown) and CVV 164 may be solenoid valves.

In some examples, an evaporative level check monitor (ELCM) 165 may be included in vent line 161 between canister 187 and atmosphere. ELCM 165 may include a vacuum pump for applying negative pressure to fuel system 200 and evaporative emissions system 186 when administering an evaporative emissions test to ensure integrity of the fuel system and evaporative emissions system. In some examples, the vacuum pump may be configured to be reversible. In other words, the vacuum pump may be configured to apply either a negative or a positive pressure on the fuel system and evaporative emissions system. While not explicitly illustrated, in some examples ELCM 165 may include a reference orifice and a pressure sensor. Following the applying of vacuum to the fuel system and evaporative emissions system, a change in pressure at the reference orifice (e.g., an absolute change or a rate of change) may be monitored and compared to a threshold. Based on the comparison, fuel system and/or evaporative emissions system degradation may be diagnosed.

An air intake system hydrocarbon trap (AIS HC) 166 may be placed in the intake manifold of engine 10 to adsorb fuel vapors emanating from unburned fuel in the intake manifold, puddled fuel from one or more fuel injectors with undesired fuel outflow, and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors may be passively desorbed from the AIS HC and combusted in the engine. Thus, during engine operation, intake fuel vapors are stored and desorbed from AIS HC 166. In addition, fuel vapors stored during an engine shutdown can also be desorbed from the AIS HC during engine operation. In this way, AIS HC 166 may be continually loaded and purged, and the trap may reduce evaporative emissions from the intake passage even when engine 10 is shut down.

FIG. 2 illustrates a dual injector, single fuel system 200 with a high pressure and a low pressure fuel rail system. Fuel system 200 may be coupled to an engine, such as engine 10 of FIG. 1. Components previously introduced may be similarly numbered.

Fuel system 200 may include fuel tank 201, in-tank fuel pump 202 that supplies fuel from fuel tank 201 to high pressure fuel pump 206 via low pressure passage 204. Fuel pump 202 also supplies fuel at a lower pressure to low pressure fuel rail 211 via low pressure passage 208. Thus, low pressure fuel rail 211 is coupled exclusively to fuel pump 202. Fuel rail 211 supplies fuel to port injectors 215a, 215b, 215c and 215d. High pressure fuel pump 206 supplies pressurized fuel to high pressure fuel rail 213 via high pressure passage 210. Thus, high pressure fuel rail 213 is coupled to each of high pressure pump 206 and fuel pump 202.

High pressure fuel rail 213 supplies pressurized fuel to fuel injectors 67a, 67b, 67c, and 67d. The fuel rail pressure in fuel rails 211 and 213 may be monitored by pressure sensors 220 and 217 respectively. Fuel pump 202 may be, in one example, an electronic return-less pump system which may be operated intermittently in a pulse mode. The engine block 216 may be coupled to an intake manifold 43 with intake air throttle 64.

A check valve 203 may be included so that the low pressure passages 204 and 208 (or alternate compliant element) hold pressure while fuel pump 202 has its input energy reduced to a point where it ceases to produce flow past the check valve 203.

Direct fuel injectors 67a-67d and port fuel injectors 66a-66d inject fuel, respectively, into engine cylinders 30a, 30b, 30c, and 30d located in an engine block 216. Each cylinder, thus, can receive fuel from two injectors where the two injectors are placed in different locations. For example, as discussed earlier in FIG. 1, one injector may be configured as a direct injector coupled so as to fuel directly into a combustion chamber while the other injector is configured as a port injector coupled to the intake manifold and delivers fuel into the intake port upstream of the intake valve. Thus, for example, cylinder 30a receives fuel from port injector 66a and direct injector 67a while cylinder 30b receives fuel from port injector 66b and direct injector 67b.

Similar to FIG. 1, the controller 12 may receive fuel pressure signals from fuel pressure sensors 220 and 217 coupled to fuel rails 211 and 213 respectively. Fuel rails 211 and 213 may also contain one or more temperature sensors for sensing the fuel temperature within the fuel rails. Controller 12 may also control operations of intake and/or exhaust valves or throttles, an engine cooling fan, spark ignition timing, fuel injection timing and/or amount, etc., to control engine operating conditions. Controller 12 may further receive throttle opening angle signals indicating the intake air throttle position via a throttle position sensor 58.

Fuel pumps 202 and 206 may be controlled by pump electronics module (PEM) 260 in some examples. PEM 260 may receive input from controller 12, for example. Controller 12 may provide PEM 260 with desired parameters so that PEM 260 may regulate the amount or speed of fuel to be fed into fuel rails 211 and 213 by fuel pump 202 and high pressure fuel pump 206 through respective fuel pump controls (not shown). Controller 12 may also request PEM 260 to completely stop fuel supply to the fuel rails 211 and 213 by shutting down pumps 202 and 206.

Injectors 67*a*-67*d* and 66*a*-66*d* may be operatively coupled to and controlled by controller 12, as is shown in FIG. 2. An amount of fuel injected from each injector and the injection timing may be determined by controller 12 from an engine map stored in the controller 12 on the basis of engine speed and/or intake throttle angle, or engine load. Each injector may be controlled via an electromagnetic valve coupled to the injector (not shown).

Fuel may be delivered by both injectors to the cylinder during a single cycle of the cylinder in some examples. For example, each injector may deliver a portion of a total fuel injection that is combusted in cylinder 30. Further, the distribution and/or relative amount of fuel delivered from each injector may vary with operating conditions, such as engine load and engine speed. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during previous exhaust stroke, or partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, previous exhaust stroke, or any appropriate combination thereof.

In one example, the amount of fuel to be delivered via port and direct injectors is empirically determined and stored in a predetermined lookup tables or functions. For example, one table may correspond to determining port injection amounts and one table may correspond to determining direct injections amounts. The two tables may be indexed to engine operating conditions, such as engine speed and engine load, among other engine operating conditions. Furthermore, the tables may output an amount of fuel to inject via port fuel injection and/or direct injection to engine cylinders at each cylinder cycle.

Accordingly, depending on engine operating conditions, fuel may be injected to the engine via port and direct injectors or solely via direct injectors or solely port injectors. For example, controller 12 may determine to deliver fuel to the engine via port and direct injectors or solely via direct injectors, or solely via port injectors based on output from predetermined lookup tables as described above.

Various modifications or adjustments may be made to the above example systems. For example, the fuel passages (e.g., 204, 208, and 210) may contain one or more filters, pressure sensors, temperature sensors, and/or relief valves. The fuel passages may in some examples include one or more fuel cooling systems.

Discussed herein, a system for a vehicle may comprise an engine with a set of engine cylinders that receive a fuel from a set of fuel injectors that in turn receive the fuel from a fuel rail. The system may further include a fuel pump that supplies the fuel from a fuel tank to the fuel rail. Such a system may further include a controller with computer readable instructions stored on non-transitory memory that when executed, cause the controller to command the fuel pump to re-pressurize the fuel rail as a function of an inferred imminent engine-start request and not in response to a request to activate the vehicle.

For such a system, the controller may store further instructions to, in response to the request to activate the vehicle, operate the vehicle in an electric-only mode of operation and maintain the engine off.

For such a system, the system may further comprise a motor that is powered via an onboard energy storage device. The controller may store further instructions to monitor a state of charge of the onboard energy storage device during a drive cycle following the request to activate the vehicle, and the inferred imminent engine-start request may be based on both a driver demand torque and the state of charge of the onboard energy storage device. In some examples, the controller may store further instructions to command the fuel pump to re-pressurize the fuel rail responsive to an indication that the driver demand torque is within a predetermined threshold of an available motor torque, where the available motor torque in turn is a function of the state of charge of the onboard energy storage device. In some examples, the vehicle may be capable of increasing the state of charge of the onboard energy storage device via a source of electricity external to the vehicle.

For such a system, the set of fuel injectors may be port fuel injectors.

Turning now to FIG. 3, depicted is a high-level example method 300 for controlling a fuel pump in a PHEV. Briefly, the method of FIG. 3 includes triggering PFI re-pressurization at a time when driver demanded torque is within a threshold of available electrical torque, and not at a time of a vehicle startup event. Triggering re-pressurization at such a determined time may reduce a potential for release of undesired evaporative emissions to atmosphere by reducing a potential for fuel to escape from one or more PFI injectors while the vehicle is being operated in electric-only mode. If the method of FIG. 3 were not implemented, then the re-pressurization at vehicle startup may enable fuel to escape from the PFIs, and in turn the fuel vapors may migrate to atmosphere by way of the intake passage to the engine, for example.

It may be understood that the method of FIG. 3 differs from control strategy for a HEV (where PFIs are re-pressurized at a time of vehicle startup), because a PHEV relies solely on electrical operation as much as possible beginning at a vehicle startup event, and relies on engine operation when driver demand torque cannot be met without activating the engine. In contrast, a HEV relies on engine operation shortly after a vehicle startup event. Thus, for the HEV, any fuel that escapes the PFIs at re-pressurization of PFIs at vehicle-startup will be drawn through the engine and combusted soon after vehicle startup due to the engine being operated shortly after the PFIs are re-pressurized.

Thus, it may be understood that a pump electronics module (PEM) for a HEV may be configured to power up the in-tank fuel pump as soon as the PEM is powered at vehicle startup events, even before the PEM of the HEV receives a command from a controller or powertrain control module (PCM). Alternatively, for the method depicted at FIG. 3, it may be understood that the PEM (e.g., PEM 260 at FIG. 2) may not power up the in-tank fuel pump (e.g., fuel pump 202 at FIG. 2) in response to the PEM being powered, but instead may provide power to the fuel pump in response to receiving a command from the controller (e.g., controller 12 at FIG. 2) during vehicle operation when driver demanded torque is within a threshold of available electrical torque.

Method 300 will be described with reference to the systems described herein and shown in FIGS. 1-2, though it should be understood that similar methods may be applied to other systems without departing from the scope of this disclosure. Method 300 may be carried out by a controller, such as controller 12 in FIG. 1, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIGS. 1-2. The controller may employ vehicle system actuators such the fuel pump (e.g., fuel pump 202 at FIG. 2), electric machine (e.g., electric machine 153 at FIG. 1), port fuel injector(s) (e.g., port fuel injectors 66 at FIG. 1), etc., to alter states of devices in the physical world according to the methods depicted below.

Method 300 begins at 302, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 304, method 300 includes determining whether a vehicle-on event is indicated. A vehicle-on event may be understood to include a request via a vehicle operator (or autonomous driver) to activate the vehicle in a manner that enables the vehicle to be driven and/or use one or more components (e.g., heating, air-conditioning, radio, media devices, etc.) of the vehicle. It may thus be understood that activating the vehicle at the vehicle-on event may include waking the controller (e.g., controller 12 at FIG. 1) and powering one or more other vehicle system modules. The vehicle-on event may be requested in some examples remotely, for example via the vehicle operator (or other passenger requesting a ride, for example from an autonomously operated vehicle) using a key-fob, or other personal device (e.g., smart phone, tablet, laptop, etc.) to request the remote start. It may be further understood that the vehicle-on event as discussed herein includes maintaining the engine off (e.g., not rotating and not combusting), at least until engine use is requested (e.g., when driver demanded torque reaches or exceeds an available motor torque).

In the event that a vehicle-on event is not indicated at 304, method 300 proceeds to 306. At 306, method 300 includes controlling operating conditions according to FIG. 4, which will be discussed in detail below. Method 300 then ends.

Returning to 304, responsive to an indication of a vehicle-on event, method 300 proceeds to 308. At 308, method 300 includes maintaining the fuel pump (e.g., fuel pump 202 at FIG. 2) off. In other words, rather than the PEM (e.g., PEM 260 at FIG. 2) immediately powering up the fuel pump (which may, in contrast, occur in a HEV) to pressurize fuel injectors (e.g., PFIs 66 at FIG. 1 and/or DIs 67 at FIG. 1), the PEM may instead refrain from providing power to the fuel pump until a command is received from the controller (e.g., controller 12 at FIG. 2) as discussed above.

Proceeding to 310, method 300 includes monitoring an available amount of positive motor torque that can be used to provide torque to driven wheels of the vehicle. The available amount of positive motor torque may be understood to be a function of one or more of battery SOC, battery temperature, current electric machine (e.g., electric machine 153 at FIG. 1) operating conditions, etc. While not explicitly illustrated, during vehicle operation method 300 may additionally include monitoring an available amount of negative torque available that can be used, for example, for regenerative braking purposes.

Continuing to 312, method 300 includes assessing whether the available amount of positive motor torque is within a predetermined threshold of driver-demanded (e.g., human driver or autonomous driver) torque. The predetermined threshold may be understood to be a positive, non-zero threshold. Driver-demand may be inferred based on one or more of accelerator pedal position, throttle plate position, etc. It may be understood that the available amount of positive motor torque may be largely a function of battery SOC, but may additionally be a function of battery temperature, status (e.g., any associated degradation) of the electric machine, etc.

If, at 312, the available amount of positive motor torque is not within the predetermined threshold of driver-demanded positive torque, then method 300 returns to 308 where the fuel pump is maintained off. In other words, the available amount of positive motor torque is greater than driver-demanded positive torque by more than the predetermined threshold. Alternatively, responsive to the available amount of positive motor torque being determined to be within the predetermined threshold of driver-demanded positive torque, method 300 proceeds to 314. At 314, method 300 includes the controller sending a signal to the PEM (e.g., PEM 260 at FIG. 2), commanding the PEM to provide power to the fuel pump to re-pressurize at least the PFI(s) (e.g., PFIs 66 at FIG. 1). It may be understood that in some examples, step 314 may further include re-pressurizing DI(s) (e.g., DIs 67 at FIG. 1), for vehicle systems that include both PFIs and DIs. The fuel pump may be activated at a predetermined speed, for example, to rapidly re-pressurize the fuel injector(s). Pressure in the fuel rail(s) (e.g., fuel rail 211 and/or fuel rail 213) may be monitored, to ensure that the re-pressurization has occurred as desired or expected.

Proceeding to 316, method 300 includes indicating if an engine start is requested. Specifically, it may be understood that the engine start may be requested when driver demanded torque exceeds available positive torque. In some examples, the engine start may be requested when driver demanded torque exceeds available positive torque by more than a positive, non-zero threshold amount. In other words, the engine may be recruited by the controller to propel the vehicle when driver demand can no longer be met solely via electrical energy.

If, at 316, an engine start is not requested, then method 300 may include maintaining the fuel pump activated, in preparation for an imminent engine start. Alternatively, responsive to an engine start request being indicated at 316, method 300 proceeds to 318 where the engine is started. Specifically, starting the engine may include relying on battery power to crank the engine, and with the engine rotating fuel injection and spark (where included) may be provided to engine cylinders so that the combusting engine may be used to propel the vehicle (and charge the battery).

With the engine activated to combust air and fuel at 318, method 300 proceeds to 320. At 320, method 300 includes controlling engine operation and electric machine operation as a function of driver demand. For example, there may be circumstances where engine operation sufficiently charges the battery so that the vehicle may be once again propelled solely via electrical energy. In such an example, the fuel pump may be deactivated, and, while not explicitly illustrated, the vehicle controller may once again monitor for a circumstance where driver demand is within the predetermined threshold of the available amount of positive motor torque. If such a situation is again encountered, the PFIs may be similarly re-pressurized in the manner described above, and the engine may be activated responsive to driver demand exceeding the ability of the electric machine to meet the driver demanded torque request. In other examples, the vehicle may simply rely on engine operation for a remainder of the drive cycle, without relying on contribution from the electric machine. In still other examples, energy usage may be partitioned between the engine and the electric machine as a function of driver demand. Method 300 may then end.

The above-described methodology with regard to FIG. 3 may reduce opportunity for release of undesired evaporative emissions to atmosphere. Specifically, by re-pressurizing the PFIs when imminent engine operation is inferred, fuel may be prevented from escaping from PFIs while the vehicle is operating in the electric-only mode (which may be entire drive cycles in many circumstances). If the PFIs were instead pressurized at the vehicle-on event (such as that which occurs in a HEV), then fuel escaping from the PFIs may lead to fuel vapors migrating through the intake of the engine to atmosphere, thereby increasing undesired evaporative emissions for the vehicle.

The above-described methodology with regard to FIG. 3 pertained to re-pressurizing PFIs when it is determined via the controller that driver demand is within the predetermined threshold of available motor torque. However, as mentioned above, it is herein recognized that in some examples the PFI re-pressurization may be based on information learned over time related to commonly traveled driving routines and estimated or predicted engine start events along such commonly traveled driving routines. The estimated or predicted engine start events may be correlated with battery SOC at the start of a learned travel routine, for example. Specifically, the controller may learn over time, an estimated time and/or approximate location along a learned travel routine where engine operation is likely to be requested, based on the route and battery SOC at the start of travel along the particular route. For example, an engine start request may be predicted and/or learned to occur at a later time along a particular drive cycle when battery SOC is greater at the start of the travel routine, as compared to a shorter time along the particular drive cycle when battery SOC is lesser at the start of the travel routine. Over time, by correlating battery SOC at the start of learned travel routes, the controller may infer/predict approximate times and/or locations where an engine start request is likely. This information may be used to re-pressurize PFI injectors, in similar fashion as that discussed above at FIG. 3. For example, in a case where PFI injectors are re-pressurized based on such learned information, then steps 310 and 312 may be replaced by a step that includes querying whether the vehicle is within a threshold time duration and/or a threshold distance of a learned or predicted engine start event. Upon determining that the vehicle is within the threshold time duration and/or the threshold distance of the learned or predicted engine start event, the controller may command the PEM (e.g., PEM 260 at FIG. 2) to power on the fuel pump to re-pressurize the PFIs.

Thus, discussed herein a method may comprise in response to a vehicle-on request via a driver of a vehicle, maintaining off a fuel pump that supplies a fuel to a fuel rail that in turn supplies the fuel to a set of fuel injectors for providing the fuel to an engine, and commanding on the fuel pump based on a predicted engine-start request during a drive cycle following the vehicle-on request.

For such a method, the driver may be an autonomous driver in some examples. The set of fuel injectors may be port fuel injectors, in some examples, and the vehicle may be a plug-in hybrid electric vehicle in some examples.

For such a method, the predicted engine-start request may be based on driver demand in some examples. The predicted engine-start request may additionally or alternatively be based on an available amount of motor torque contributable via a motor that is used to propel the vehicle in an absence of operation of the engine.

For such a method, the method may further comprise maintaining off the fuel pump for an entirety of the drive cycle responsive to an absence of the predicted engine-start request during the drive cycle.

For such a method, the method may further comprise learning a set of commonly traveled routes of the vehicle over including, for each route of the set of commonly traveled routes, an approximate engine-start request time. In such an example, the predicted engine-start request may be based on the approximate engine-start request time.

For such a method, commanding on the fuel pump may occur prior to an actual engine-start request.

The above-described methodology with regard to FIG. 3 pertained to vehicle-on conditions. However, it is further recognized herein that in some examples fuel may escape PFIs of a PHEV under vehicle-off conditions, which similarly may lead to an increase in undesired evaporative emissions. For example, pressure in a fuel rail may fluctuate during vehicle-off conditions due to diurnal temperature fluctuations. Specifically, pressure in the fuel rail may decrease as ambient temperature decreases, but may increase as ambient temperature increases. Such an increase in ambient temperature may thus lead to PFI re-pressurization in some examples during vehicle-off conditions. It may be desirable under circumstances of PFI re-pressurization during vehicle-off conditions to take mitigating action to reduce an opportunity for fuel vapors that may result from fuel escaping from re-pressurized PFIs to migrate to atmosphere in the form of undesired evaporative emissions. Methodology for taking such mitigating action is discussed below at FIG. 4.

Turning now to FIG. 4, depicted is a high-level example method 400 for taking mitigating action to reduce a potential for release of undesired evaporative emissions to atmosphere in a PHEV during vehicle-off conditions. Briefly, method 400 includes monitoring one or more of ambient temperature and pressure in a fuel rail of PFIs (e.g., fuel rail 211 at FIG. 2) during vehicle-off conditions, and controlling the vehicle system in a manner to reduce the potential for release of undesired evaporative emissions to atmosphere when it is inferred or measured that the fuel rail that provides fuel to PFIs has re-pressurized.

Method 400 will be described with reference to the systems described herein and shown in FIGS. 1-2, though it should be understood that similar methods may be applied to other systems without departing from the scope of this disclosure. Method 400 may be carried out by a controller, such as controller 12 in FIG. 1, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-2. The controller may employ vehicle system actuators such the fuel pump (e.g., fuel pump 202 at FIG. 2), electric machine (e.g., electric machine 153 at FIG. 1), fuel injector(s) (e.g., port fuel injectors 66 and/or direct injection fuel injectors 66 at FIG. 1), throttle (e.g., throttle 64 at FIG. 1), CPV (e.g., CPV 163 at FIG. 1), CVV (e.g., CVV 164 at FIG. 1), ELCM (e.g., ELCM 165 at FIG. 1), etc., to alter states of devices in the physical world according to the methods depicted below.

Method 400 begins at 402, and includes evaluating vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., various electric machine-related conditions, such as battery state of charge (SOC), battery temperature, electric machine temperature, etc., as well as various ambient conditions, such as ambient temperature, humidity, barometric pressure, etc.

Proceeding to 404, method 400 includes determining whether a vehicle-off event is indicated. A vehicle-off event may include a situation where the vehicle comes to a stop, and the vehicle is deactivated (e.g., powered off). The vehicle may be deactivated from a condition where the engine is operating, or from a condition where the engine is not operating. The vehicle-off event may be requested via a human or autonomous controller. If, at 404, a vehicle-off event is not indicated, method 400 proceeds to 406. At 406, method 400 includes maintaining current vehicle operating conditions. For example, if the vehicle is in operation, the operation may be controlled by the methodology of FIG. 3 discussed above, where conditions may continue to be monitored for a vehicle-off event.

Returning to 404, responsive to an indication of a vehicle-off event, method 400 proceeds to 408. At 408, method 400 includes setting a controller wake-up schedule to monitor ambient temperature and/or fuel rail pressure (e.g., fuel rail 211 and/or fuel rail 213 at FIG. 2). The schedule may be a function of diurnal temperature cycle changes, in some examples. For example, the vehicle controller may request information over the wireless network (e.g., wireless network 183) pertaining to forecasted diurnal temperature swing for the current day (and in some examples upcoming day or days). For example, the controller may request information from a weather server. In some examples, forecasted diurnal temperature change may additionally or alternatively be retrieved from the onboard navigation system (e.g., onboard navigation system 184 at FIG. 1). The controller wake/sleep schedule may be a function of when it is predicted that the diurnal temperature cycle will be close to its maximum temperature. For example, the controller may be woken more frequently to infer the diurnal temperature when it is predicted that the diurnal cycle will be close to the maximum daily temperature, as compared to being woken less frequently at times when it is predicted that the temperature will be decreasing. This may reduce the use of battery power, for example.

When the controller is woken from sleep mode, the controller may retrieve information pertaining to fuel rail pressure and ambient temperature. The results may be stored at the controller, and then the controller may again be slept until the next scheduled wakeup event. The controller may process the acquired data, to infer when diurnal temperature has reached its maximum daily temperature and/or when fuel rail pressure has reached its maximum re-pressurization due to the diurnal temperature increase. To infer the maximum daily temperature and/or maximum fuel rail re-pressurization, it may be understood that the controller may be woken and the relevant parameters measured, at one or more time points after the maximum daily temperature and/or maximum fuel rail re-pressurization has occurred.

Proceeding to 410, method 400 includes indicating whether conditions are met for routing fuel vapors to the fuel vapor storage canister (e.g., 187). More specifically, step 410 queries whether conditions are such that it may be desirable to route fuel vapors stemming from fuel escaping fuel injectors (e.g., PFI injectors 66 and/or DI injectors 67 at FIG. 1) to the fuel vapor storage canister. As will be discussed in further detail below, routing fuel vapors to the canister may include rotating the engine unfueled in a reverse direction via use, for example, of the electric machine (e.g., electric machine 153), and concurrently activating the vacuum pump associated with the ELCM (e.g., ELCM 165 at FIG. 1) in a vacuum-mode of operation to draw the fuel vapors from the engine and/or engine intake to the canister for storage. Thus, conditions being met at 410 may include a canister load being below a predetermined threshold canister load. For example, if the canister load is greater than the predetermined threshold canister load, then fuel vapors stored therein may be drawn in the direction of atmosphere along the vent line (e.g., vent line 161 at FIG. 1), which may result in release of undesired evaporative emissions to atmosphere. Thus, the predetermined threshold canister load may represent a canister loading state where routing additional fuel vapors to the canister is unlikely to result in any release of undesired evaporative emissions to atmosphere.

Additionally or alternatively, conditions being met at 410 may include an indication of a battery SOC being greater than a threshold battery SOC. Specifically, because the routing of fuel vapors to the canister includes rotating the engine unfueled via use of electrical energy, conditions may not be met for doing so if battery SOC is below the threshold battery SOC. Additionally or alternatively, conditions being met at 410 may include an indication that a maximum diurnal fuel rail pressure has been reached and/or that a maximum diurnal temperature has been reached during the vehicle-off condition.

Additionally or alternatively, conditions being met at 410 may include an indication that pressure in the fuel rail (e.g., fuel rail 211 and/or fuel rail 213 at FIG. 2) is above a fuel rail pressure threshold. In other words, if pressure has not reached or exceeded the fuel rail pressure threshold, then it may not be desirable to conduct the operation for routing fuel vapors to the canister, because pressure in the fuel rail(s) may not be such that fuel actually escaped the injector(s). Alternatively, some amount of fuel escaping the injector(s) may be assumed under conditions where the pressure has reached or exceeded the fuel rail pressure threshold.

If, at 410, conditions are indicated for routing fuel vapors to the canister, method 400 proceeds to 412. At 412, method 400 includes routing fuel vapors stemming from fuel that may have escaped from the fuel injector(s) to the fuel vapor storage canister for storage. Specifically, at 412 method 400 includes rotating the engine unfueled at a predetermined speed, and activating the vacuum pump associated with the ELCM to draw fuel vapors from the engine compartment to the fuel vapor storage canister. While not explicitly illustrated at FIG. 4, routing the fuel vapors to the fuel vapor storage canister may include commanding the intake throttle closed, and commanding the CPV fully open. The CVV may be maintained fully open for the routing of the fuel vapors to the canister. In a case where the vehicle includes the FTIV positioned in the recovery line between the fuel tank and the canister, the FTIV may be commanded/maintained closed.

By rotating the engine unfueled, air may be drawn in from the exhaust and through the engine, which may result in an air flow into the intake of the engine. The combined action of engine operation and air flow may serve to vaporize any fuel puddled in the engine cylinders and/or intake manifold of the engine. Once vaporized, the fuel vapors may be routed to the canister due to the combined action of the engine being rotated in the reverse mode and the ELCM operating to draw the fuel vapors in the direction of the canister. In some examples, to improve vaporization of any puddled fuel, the emissions control device heater (e.g., heater 71 at FIG. 1) may be activated so as to raise a temperature of the air being pushed through the engine. In some examples, the heater may be activated prior to the engine being rotated unfueled in the reverse direction. The heater may then be either maintained activated during engine rotation, or may be turned off for the engine rotation. In another example, the engine rotation and the activation of the heater may be concurrent (where the heater is not activated prior to engine rotation). A temperature sensor (not shown) for monitoring a temperature of the emissions control device may in some examples be used to infer when a desired temperature for improving fuel vaporization has been reached. For example, reverse unfueled engine rotation may commence when the emissions control device has reached a predetermined temperature in some examples.

The routing of the fuel vapors to the canister may take place over a predetermined time frame. In some examples, the predetermined time frame may be adjustable. For example, a shorter time frame may be used when a maximum pressure reached in the fuel rail is lower, and a greater time frame may be used when a maximum pressure reached in the fuel rail is greater. Along similar lines, the speed at which the engine is rotated unfueled and/or a speed of the vacuum pump may be variable based on, for example, maximum pressure in the fuel rail(s). In some examples, the speed at which the engine is rotated and/or the speed of the vacuum pump may additionally or alternatively be a function of battery SOC, where lesser speeds are commanded when battery SOC is lower.

While not explicitly illustrated, in some examples canister temperature may be monitored at a point near (e.g., within a threshold distance of) where the vent line connects to the canister, to infer whether fuel vapors are breaking through the canister. If so, the method may be discontinued. For example, a temperature change associated with a temperature sensor near the vent line greater than a threshold temperature change may indicate a high probability that fuel vapors are escaping the canister and entering the vent line.

Responsive to the predetermined time frame elapsing, method 400 proceeds to 413. At 413, method 400 includes discontinuing routing the fuel vapors to the canister. Specifically, the controller may command the electric machine to stop rotating the engine in reverse, and the vacuum pump associated with the ELCM may be deactivated. Furthermore, the CPV may be commanded closed and the throttle may be returned to the position it was in prior to the routing of fuel vapors to the canister.

With the routing of the fuel vapors to the canister discontinued, method 400 returns to 408. At 408, method 400 includes once again setting the controller wake/sleep schedule in similar fashion as that discussed above.

Returning to 410, if conditions are not met for routing fuel vapors stemming from fuel that escaped from fuel injector(s) to the canister for storage, then method 400 proceeds to 414. At 414, method 400 includes indicating whether conditions are met for conducting an engine startup to combust any fuel that may have escaped from the fuel injector(s). In other words, if one or more of battery SOC is lower than the threshold SOC, canister load is greater than the predetermined threshold canister load, etc., then it may not be possible to mitigate the issue of fuel escaping from the fuel injector(s) using the methodology of step 412. However, it may be possible to start the engine so that the escaped fuel is combusted by the engine. In some examples, conditions being met at 414 may include an indication provided by one or more of the driving sensor(s) (e.g., camera(s), lidar, radar), V2X communications, navigation system, etc., that the vehicle is in a location or situation where it is not undesirable to start the engine. Such a location or situation may be established by the vehicle manufacturer, for example, or may be a variable that may be set by a technician or even the vehicle operator in some examples. Conditions being met at 414 may include an indication that the fuel injector(s) have been re-pressurized to above the fuel rail pressure threshold mentioned above, due to the diurnal temperature rise. For example, conditions may be met when the diurnal temperature has reached its maximum daily temperature and/or when fuel rail pressure has reached its maximum re-pressurization (and has reached or exceeded the fuel rail pressure threshold, for example). It may be understood that, once the maximum daily temperature has been reached, a cooling period may ensue where a vacuum may develop in the fuel rail(s).

If, at 414, conditions are not met, meaning that the controller infers that it is not time for conducting the engine start, method 400 proceeds to 418. At 418, method 400 includes indicating whether a vehicle-on event is requested. A vehicle-on request may be similar to that discussed above at step 304 and will not be reiterated here for brevity. If a vehicle-on request is indicated, then method 400 may proceed to step 308 of FIG. 3, where method 300 may be carried out as discussed above. Method 400 may then end.

Alternatively, if at 414, conditions are indicated to be met for conducting the engine start, then method 400 proceeds 416. At 416, method 400 includes the controller commanding an engine startup where fuel (and spark) are provided to engine cylinders such that the engine combusts any fuel in the intake manifold and/or puddled in engine cylinders. For example, fuel that escapes PFI injector(s) may puddle in the intake manifold, and may be drawn into the engine and combusted upon engine activation at step 416. Additionally or alternatively, fuel that escapes DI injector(s) may puddle in engine cylinders, and may be combusted upon engine activation at step 416. The engine may be allowed to operate for a predetermined amount of time (e.g., 5 seconds, 10 seconds, 20 seconds, 40 seconds, one minute, 2 minutes, etc.) before being commanded the again be shut down. Responsive to the engine being shut down, method 400 proceeds to 408. At 408, method 400 includes again setting the controller wake/sleep schedule similar to that discussed above.

Thus, discussed herein, a method may comprise responsive to a vehicle-on request, re-pressurizing a fuel rail that supplies a fuel to a set of port fuel injectors that in turn provide the fuel to the engine as a function of a driver demand and an available amount of motor torque that can be supplied via a motor for propelling the vehicle and not based on the vehicle-on request. Responsive to a vehicle-off request, the method may include inferring that the fuel rail has passively re-pressurized, and controlling operation of the engine based on the inference that the fuel rail has passively re-pressurized.

For such a method, re-pressurizing the fuel rail as the function of the driver demand and the available amount of motor torque may further comprise determining that the driver demand is within a predetermined threshold of the available amount of motor torque, an in turn, activating a fuel pump to re-pressurize the fuel rail.

For such a method, the method may further comprise inferring that the fuel rail has passively re-pressurized based on a monitored pressure in the fuel rail and/or based on an ambient temperature change following the vehicle-off request. In such an example, controlling operation of the engine may include operating the engine to reduce a potential for release of undesired evaporative emissions to atmosphere stemming from the fuel escaping from one or more injectors of the set of port fuel injectors due to the re-pressurizing of the fuel rail. In some examples, controlling operation of the engine may include commanding the engine activated in a combusting mode for a predetermined amount of time. In some examples, controlling operation of the engine may include establishing a path from the engine to a fuel vapor storage canister, and rotating the engine unfueled in a reverse mode to create an air flow that routes fuel vapors stemming from the fuel escaping from the one or more injectors of the set of port fuel injectors to the fuel vapor storage canister.

FIG. 5 depicts a prophetic example timeline 500 for controlling the fuel pump (e.g., fuel pump 202 at FIG. 2) according to the method of FIG. 3. Timeline 500 includes plot 505, indicating whether a vehicle-on event is requested (yes or no), over time. Timeline 500 further includes plot 510, indicating pressure of the low pressure fuel rail (e.g., low pressure fuel rail 211 at FIG. 2), over time. The pressure may be at atmospheric pressure, greater (+) than atmospheric pressure, or less (−) than atmospheric pressure. Timeline 500 further includes plot 515, indicating driver (e.g., a human or an autonomous driver) requested torque, plot 516, indicating available positive (+) electric motor (e.g., motor 153 at FIG. 1) torque, and plot 517, indicating available negative (−) electric motor torque, over time. Timeline 500 further includes plot 520, indicating engine status (on or off), over time. It may be understood that, in example timeline 500, when the engine is "on", the engine is rotating in a forward or default direction. Timeline 500 further includes plot 525, indicating whether port fuel injection is being provided to the engine cylinders, over time. It may be understood that when port fuel injection is "on" fuel is being provided to engine cylinders via port fuel injector(s) (e.g., port fuel injector(s) 66 at FIG. 1). Timeline 500 further includes plot 530, indicating whether the fuel pump (e.g., fuel pump 202 at FIG. 2) is on or off, over time.

At time t0, the vehicle is off (plot 505), and pressure in the fuel rail (e.g., fuel rail 211 at FIG. 2) that supplies fuel to PFIs is below a PFI pressure threshold represented by line 511. The PFI threshold may be a threshold pressure where, when pressure is above the PFI threshold the PFIs are sufficiently pressurized to provide fuel to engine cylinders for non-degraded engine operation. Alternatively, pressure in the fuel rail below the PFI pressure threshold may result in some level of degraded engine operation. With the vehicle off at time t0, the engine is also off (plot 520), PFIs are not injecting fuel (plot 525) and the fuel pump (e.g., fuel pump 202 at FIG. 2) is off (plot 530).

At time t1, a vehicle-on event is indicated. As discussed above, a vehicle-on event for a PHEV includes maintaining the engine off, and accordingly, the engine is maintained off (plot 520) at time t1. With the engine being maintained off, PFIs are maintained off and the fuel pump is additionally maintained off. With the fuel pump maintained off, PFIs are not re-pressurized at time t1 responsive to the vehicle-on event.

Between time t1 and t2, driver demand (plot 515) fluctuates between positive torque requests and negative torque requests. With the engine off, it may be understood that the driver-demanded torque request is met solely via the electric machine (e.g., electric machine 153 at FIG. 1) which receives power from the onboard energy storage device (e.g., battery 158 at FIG. 1). As battery power is consumed, the available amount of positive motor torque (plot 516) decreases. Because, between time t1 and t2 the driver-demanded wheel torque does not come within the predetermined threshold of the amount of available positive motor torque, the fuel pump is maintained off.

However, at time t2 driver demand comes within the predetermined threshold (refer to dashed lines 518) of the available positive motor torque amount (plot 516). Accordingly, the controller (e.g., controller 12 at FIG. 2) commands the PEM (e.g., PEM 260 at FIG. 2) to power the fuel pump so that the fuel pump begins operating to re-pressurize the PFIs. Accordingly, between time t2 and t3, pressure in the fuel rail that provides fuel to the PFIs increases to above the PFI pressure threshold. The engine is maintained off between time t2 and t3 due to the fact that driver demand has not yet exceeded the available amount of positive motor torque available to meet the driver demand.

At time t3, driver demand exceeds the amount of positive motor torque available, and accordingly the engine is activated (e.g., cranked) and at time t4 the engine is fueled via the controller commanding fuel injection via the PFIs. With the engine combusting at time t4, the engine provides the energy to propel the vehicle according to driver demand, and to charge the battery.

Turning now to FIG. 6, depicted is a prophetic example timeline 600 for reducing a potential for release of undesired evaporative emissions to atmosphere during vehicle-off conditions, according to the method of FIG. 4. Timeline 600 includes plot 605, indicating whether the vehicle is on or off, over time. Timeline 600 further includes plot 610, indicating ambient temperature, over time. Ambient temperature may be greater (+) or lesser (−), over time. Timeline 600 further includes plot 620, indicating a status (open or fully closed) of the CPV (e.g., CPV 163 at FIG. 1), over time. Timeline 600 further includes plot 625, indicating engine status, over time. In this example timeline, the engine may be off (e.g., not rotating), may be rotating unfueled in reverse (On-R), or may be rotating unfueled in a forward or default direction (On-F), over time. Timeline 600 further includes plot 630, indicating a status (open or fully closed) of the CVV (e.g., CVV 164 at FIG. 1), over time. Timeline 600 further includes plot 635, indicating a status of the ELCM (e.g., ELCM 165 at FIG. 1), over time. In this example timeline, when the ELCM is "on", it may be understood that the vacuum pump associated with the ELCM is operating in a vacuum-mode to impart a vacuum (e.g., negative pressure with respect to atmospheric pressure) on at least the evaporative emissions system (e.g., evaporative emissions system 186 at FIG. 1). Timeline 600 further includes plot 640, indicating a position of the throttle plate (e.g., throttle plate 61 at FIG. 1) associated with the intake throttle (e.g., throttle 64 at FIG. 1), over time. The throttle may be fully open (O), fully closed (C), or somewhere in between, over time. Timeline 600 further includes plot 645, indicating a loading state of the canister (e.g., canister 187 at FIG. 1), over time. Specifically, canister load may be greater (+) or lesser (−), over time. Timeline 600 further includes plot 650, indicating fuel injection status, over time. Fuel injection may be "on" or "off", over time. When fuel injection is off, it may be understood that no fuel is being provided to engine cylinders, neither from port injection nor direct injection.

At time t0, the vehicle is off (plot 605), and accordingly the engine is off (plot 625) and fuel is not being provided to the engine (plot 650). The CPV is closed (plot 620), the CVV is open (plot 630), and the ELCM is off (plot 635). The throttle is configured in a position it was in when the vehicle-off event occurred. The canister is loaded to some extent, but is well below the threshold canister load (represented by line 646). It may be understood that the threshold canister load represents a canister loading state where it may not be desirable to route any fuel vapors stemming from the engine compartment to the canister, as doing so may result in fuel vapors being drawn or pushed out of the canister toward atmosphere.

At time t0, the controller is asleep, but it may be understood that the sleep/wake schedule has been set based on the methodology discussed above with regard to FIG. 4. Specifically, the controller may, at the time of the vehicle-off event, assess when it is predicted that the diurnal temperature rise may occur, so that the controller is not unnecessarily repeatedly woken during times when it is highly likely that the fuel rail(s) are not being re-pressurized as a function of an ambient temperature increase.

Thus, between time t0 and t1, the controller is woken twice, in order to retrieve information pertaining to ambient temperature and pressure in the fuel rail (e.g., fuel rail 211 at FIG. 2). The information, while not explicitly illustrated, may be stored at the controller prior to the controller once again being slept. Furthermore, the controller may process the acquired data to infer whether ambient temperature is at a maximum of the diurnal cycle, or whether temperature is still increasing or is decreasing.

At time t1, the wake/sleep schedule dictates that the controller be woken at a faster rate so as to capture an inflection point where the diurnal cycle switches from a heat gain portion (e.g., temperatures increasing) to a heat loss portion (e.g., temperatures decreasing) of the diurnal cycle. Accordingly, between time t1 and t2 (which is of a similar timeframe as that between time t0 and t1), the controller is woken five times. Again, the information retrieved by the controller including ambient temperature and fuel rail pressure measurements may be stored at the controller and processed to infer the inflection point mentioned above.

At time t2, the controller infers that the diurnal cycle is in a heat loss portion, and as such, determines whether conditions are met for routing fuel vapors stemming from fuel escaping the PFI(s) (and in some examples DIs) to the fuel vapor canister for storage. While not explicitly illustrated, it may be understood that in this example timeline 600 the pressure in the fuel rail (e.g., fuel rail 211 at FIG. 2) has exceeded the PFI threshold during the ambient temperature increase, indicating that it likely that some amount of fuel has escaped the PFIs during the re-pressurization.

Conditions are indicated to be met at time t2, as canister load is below the threshold canister load (plot 645 in relation to line 646), and while not explicitly illustrated, it may be understood that battery SOC is greater than the threshold SOC mentioned above at FIG. 4. Accordingly, the CPV is commanded open, the throttle is commanded closed, and the engine is commanded to be rotated unfueled in reverse to generate an air flow in the direction of the fuel vapor canister. Additionally, the vacuum pump associated with the ELCM is commanded on, to assist in drawing the fuel vapors to the canister for storage. The routing of fuel vapors is conducted for a predetermined time period spanning time t2 to t3, before the routing is discontinued at time t3. The routing is discontinued by commanding closed the CPV, returning the throttle to its original position, commanding the engine to stop being rotated unfueled in reverse, and commanding the vacuum pump associated with the ELCM off. Between time t2 and t3, canister load slightly increases due to the additional fuel vapors routed to the canister.

After time t3, the controller once again sets the wake/sleep schedule so as to, once again monitor for a circumstance where the fuel rail(s) become re-pressurized in order to again take mitigating action to reduce the potential for release of undesired evaporative emissions to atmosphere.

While the prophetic example timeline at FIG. 6 depicted a situation where conditions were met for routing fuel vapors in the engine compartment to the canister, it may be understood that in other examples where conditions are not met for doing so (e.g., when canister load is greater than the threshold canister load), then the engine may be commanded to be activated in a combusting mode to combust any fuel and vapors stemming from PFI (and in some examples DI) re-pressurization during the vehicle-off condition.

In this way, release of undesired evaporative emissions to atmosphere may be reduced or avoided for vehicles that rely preferentially on an electric-only mode of operation, and which rely on an engine for vehicle propulsion at times when driver demanded wheel torque cannot continue to be met solely via the electric-only mode.

The technical effect of re-pressurizing port fuel injectors (and in some examples direct fuel injectors as well) at a determined time (when driver demand is within the predetermined threshold of an available amount of positive motor torque that can be used to propel the vehicle) during a vehicle drive cycle is to reduce or avoid fuel escaping from the port fuel injectors (and in some examples direct fuel injectors as well) during engine-off vehicle operation. Reducing or avoiding the fuel escaping from the port fuel injectors (and in some examples direct fuel injectors as well), may reduce an amount of fuel that puddles in the intake manifold and/or engine cylinders. If such action were not taken to reduce the amount of fuel escaping to the intake manifold and/or engine cylinders, then fuel vapors stemming from the fuel that escaped the fuel injector(s) may vaporize and the fuel vapors may migrate through the intake passage to atmosphere, thereby increasing release of undesired evaporative emissions to atmosphere.

As another example, the technical effect of monitoring ambient temperature and/or fuel rail pressure during vehicle-off conditions is to infer an appropriate time t0 take mitigating action to route fuel vapors that may have escaped the fuel injector(s) due to re-pressurization resulting from ambient temperature increases to a fuel vapor storage canister. In some examples where conditions are not met for routing the fuel vapors to the canister, another option may be to activate the engine in a combusting mode so as to combust any fuel that has puddled in the intake manifold and/or engine cylinders. Such action may reduce release of undesired evaporative emissions to atmosphere even under circumstances where the fuel rail (e.g. port fuel injector fuel rail, or even direct fuel injector fuel rail) becomes passively re-pressurized as a result of diurnal temperature swings during vehicle-off conditions.

The systems and methods discussed herein may enable one or more systems and one or more methods. In one example, a method comprises in response to a vehicle-on request via a driver of a vehicle, maintaining off a fuel pump that supplies a fuel to a fuel rail that in turn supplies the fuel to a set of fuel injectors for providing the fuel to an engine; and commanding on the fuel pump based on a predicted engine-start request during a drive cycle following the vehicle-on request. In a first example of the method, the method further includes wherein the driver is an autonomous driver. A second example of the method optionally includes the first example, and further includes wherein the set of fuel injectors are port fuel injectors. A third example of the method optionally includes any one or more or each of the first through second examples, and further includes wherein the vehicle is a plug-in hybrid electric vehicle. A fourth example of the method optionally includes any one or more or each of the first through third examples, and further includes wherein the predicted engine-start request is based on driver demand. A fifth example of the method optionally includes any one or more or each of the first through fourth examples, and further includes wherein the predicted engine-start request is based on an available amount of a motor torque contributable via a motor that is used to propel the vehicle in an absence of operation of the engine. A sixth example of the method optionally includes any one or more or each of the first through fifth examples, and further comprises maintaining off the fuel pump for an entirety of the drive cycle responsive to an absence of the predicted engine-start request during the drive cycle. A seventh example of the method optionally includes any one or more or each of the first through sixth examples, and further comprises learning a set of commonly traveled routes of the vehicle over time including, for each route of the set of commonly traveled routes, an approximate engine-start request time; and wherein the predicted engine-start request is based on the approximate engine-start request time. An eighth example of the method optionally includes any one or more or each of the first through seventh examples, and further includes wherein commanding on the fuel pump occurs prior to an actual engine-start request.

Another example of a method comprises responsive to a vehicle-on request, re-pressurizing a fuel rail that supplies a fuel to a set of port fuel injectors that in turn provide the fuel to the engine as a function of a driver demand and an available amount of motor torque that can be supplied via a motor for propelling the vehicle and not based on the vehicle-on request; and responsive to a vehicle-off request, inferring that the fuel rail has passively re-pressurized, and controlling operation of the engine based on the inference that the fuel rail has passively re-pressurized. In a first example of the method, the method further includes wherein re-pressurizing the fuel rail as the function of the driver demand and the available amount of motor torque further comprises: determining that the driver demand is within a predetermined threshold of the available amount of motor torque, an in turn, activating a fuel pump to re-pressurize the fuel rail. A second example of the method optionally includes the first example, and further comprises inferring that the fuel rail has passively re-pressurized based on a monitored pressure in the fuel rail and/or based on an ambient temperature change following the vehicle-off request; and wherein controlling operation of the engine includes operating the engine to reduce a potential for release of undesired evaporative emissions to atmosphere stemming from the fuel escaping from one or more injectors of the set of port fuel injectors due to the re-pressurizing of the fuel rail. A third example of the method optionally includes any one or more or each of the first through second examples, and further includes wherein controlling operation of the engine includes commanding the engine activated in a combusting mode for a predetermined amount of time. A fourth example of the method optionally includes any one or more or each of the first through third examples, and further includes wherein controlling operation of the engine includes establishing a path from the engine to a fuel vapor storage canister, and rotating the engine unfueled in a reverse mode to create an air flow that routes fuel vapors stemming from the fuel escaping from the one or more injectors of the set of port fuel injectors to the fuel vapor storage canister.

An example of a system for a vehicle comprises an engine with a set of engine cylinders that receive a fuel from a set of fuel injectors that in turn receive the fuel from a fuel rail; a fuel pump that supplies the fuel from a fuel tank to the fuel rail; and a controller with computer readable instructions stored on non-transitory memory that when executed, cause the controller to: command the fuel pump to re-pressurize the fuel rail as a function of an inferred imminent engine-start request and not in response to a request to activate the vehicle. In a first example of the system, the system further includes wherein the controller stores further instructions to, in response to the request to activate the vehicle, operate the vehicle in an electric-only mode of operation and maintain the engine off. A second example of the system optionally includes the first example, and further comprises a motor that is powered via an onboard energy storage device; wherein the controller stores further instructions to monitor a state of charge of the onboard energy storage device during a drive cycle following the request to activate the vehicle; and wherein the inferred imminent engine-start request is based on both a driver demand torque and the state of charge of the onboard energy storage device. A third example of the system includes any one or more or each of the first through second examples, and further includes wherein the controller stores further instructions to command the fuel pump to re-pressurize the fuel rail responsive to an indication that the driver demand torque is within a predetermined threshold of an available motor torque, the available motor torque in turn a function of the state of charge of the onboard energy storage device. A fourth example of the system includes any one or more or each of the first through third examples, and further includes wherein the vehicle is capable of increasing the state of charge of the onboard energy storage device via a source of electricity external to the vehicle. A fifth example of the system optionally includes any one or more or each of the first through fourth examples, and further includes wherein the set of fuel injectors are port fuel injectors.

In another embodiment, a method comprises responsive to a vehicle-off event, monitoring one or more of an ambient temperature and a pressure in a fuel rail of a vehicle, and based on one or more of the ambient temperature and the pressure in the fuel rail, taking mitigating action to reduce a potential for release of undesired evaporative emissions to atmosphere. In a first example of the method, the potential for release of undesired evaporative emissions to atmosphere is based on the fuel rail becoming pressurized to greater than a pressure threshold. In a second example of the method, taking mitigating action to reduce the potential for release of undesired evaporative emissions to atmosphere occurs at or near an inflection point where ambient temperature reaches a maximum diurnal temperature and begins to decline. In a third example of the method, taking mitigating action includes rotating an engine unfueled in reverse while concurrently activating a vacuum pump positioned in a vent line that couples a fuel vapor storage canister to atmosphere, to draw fuel vapors from the engine to the fuel vapor storage canister. In such an example, the method includes establishing a pathway to route the fuel vapors from the engine to the fuel vapor storage canister, which includes commanding open a canister purge valve, fully closing an air intake throttle, and commanding fully open a canister vent valve positioned in the vent line. In a fourth example of the method, taking mitigating action includes activating the engine in a combusting mode of operation. In such an example, the fuel vapor canister is loaded to a level greater than a threshold canister load and/or a battery state of charge is lower than a threshold battery state of charge. In a fifth example of the method, the fuel rail provides a fuel to a set of port fuel injectors. In a sixth example of the method, the vehicle is a plug-in hybrid electric vehicle.

In yet another embodiment, a method comprises controlling a fuel pump of a vehicle as a function of an approximate location of the vehicle as the vehicle travels along a drive cycle. In a first example, the drive cycle comprises a learned drive cycle. In a second example, the approximate location is a location associated with an engine start request. In a third example, the approximate location is a function of a battery state of charge at a starting point of the learned drive cycle. In a fourth example, controlling the fuel pump includes maintaining deactivated the fuel pump until the vehicle reaches the approximate location, and then activating the fuel pump to re-pressurize a fuel rail that provides a fuel to a set of port fuel injectors.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    in response to a vehicle-on request via a driver of a vehicle, maintaining off a fuel pump that supplies a fuel to a fuel rail that in turn supplies the fuel to a set of fuel injectors for providing the fuel to an engine; and
    commanding on the fuel pump based on a predicted engine-start request during a drive cycle following the vehicle-on request.

2. The method of claim 1, wherein the driver is an autonomous driver.

3. The method of claim 1, wherein the set of fuel injectors are port fuel injectors.

4. The method of claim 1, wherein the vehicle is a plug-in hybrid electric vehicle.

5. The method of claim 1, wherein the predicted engine-start request is based on driver demand.

6. The method of claim 1, wherein the predicted engine-start request is based on an available amount of a motor torque contributable via a motor that is used to propel the vehicle in an absence of operation of the engine.

7. The method of claim 1, further comprising maintaining off the fuel pump for an entirety of the drive cycle responsive to an absence of the predicted engine-start request during the drive cycle.

8. The method of claim 1, further comprising learning a set of commonly traveled routes of the vehicle over time including, for each route of the set of commonly traveled routes, an approximate engine-start request time; and
    wherein the predicted engine-start request is based on the approximate engine-start request time.

9. The method of claim 1, wherein commanding on the fuel pump occurs prior to an actual engine-start request.

10. A system for vehicle, comprising:
    an engine with a set of engine cylinders that receive a fuel from a set of fuel injectors that in turn receive the fuel from a fuel rail;
    a fuel pump that supplies the fuel from a fuel tank to the fuel rail; and
    a controller with computer readable instructions stored on non-transitory memory that when executed, cause the controller to:

command the fuel pump to re-pressurize the fuel rail as a function of an inferred imminent engine-start request and not in response to a request to activate the vehicle.

11. The system of claim 10, wherein the controller stores further instructions to, in response to the request to activate the vehicle, operate the vehicle in an electric-only mode of operation and maintain the engine off.

12. The system of claim 10, further comprising a motor that is powered via an onboard energy storage device;
wherein the controller stores further instructions to monitor a state of charge of the onboard energy storage device during a drive cycle following the request to activate the vehicle; and
wherein the inferred imminent engine-start request is based on both a driver demand torque and the state of charge of the onboard energy storage device.

13. The system of claim 12, wherein the controller stores further instructions to command the fuel pump to re-pressurize the fuel rail responsive to an indication that the driver demand torque is within a predetermined threshold of an available motor torque, the available motor torque in turn a function of the state of charge of the onboard energy storage device.

14. The system of claim 12, wherein the vehicle is capable of increasing the state of charge of the onboard energy storage device via a source of electricity external to the vehicle.

15. The system of claim 10, wherein the set of fuel injectors are port fuel injectors.

16. A method comprising:
responsive to a vehicle-on request, re-pressurizing a fuel rail that supplies a fuel to a set of port fuel injectors that in turn provide the fuel to the engine as a function of a driver demand and an available amount of motor torque that can be supplied via a motor for propelling the vehicle and not based on the vehicle-on request; and
responsive to a vehicle-off request, inferring that the fuel rail has passively re-pressurized, and controlling operation of the engine based on the inference that the fuel rail has passively re-pressurized.

17. The method of claim 16, wherein re-pressurizing the fuel rail as the function of the driver demand and the available amount of motor torque further comprises:
determining that the driver demand is within a predetermined threshold of the available amount of motor torque, an in turn, activating a fuel pump to re-pressurize the fuel rail.

18. The method of claim 16, further comprising inferring that the fuel rail has passively re-pressurized based on a monitored pressure in the fuel rail and/or based on an ambient temperature change following the vehicle-off request; and
wherein controlling operation of the engine includes operating the engine to reduce a potential for release of undesired evaporative emissions to atmosphere stemming from the fuel escaping from one or more injectors of the set of port fuel injectors due to the re-pressurizing of the fuel rail.

19. The method of claim 18, wherein controlling operation of the engine includes commanding the engine activated in a combusting mode for a predetermined amount of time.

20. The method of claim 18, wherein controlling operation of the engine includes establishing a path from the engine to a fuel vapor storage canister, and rotating the engine unfueled in a reverse mode to create an air flow that routes fuel vapors stemming from the fuel escaping from the one or more injectors of the set of port fuel injectors to the fuel vapor storage canister.

* * * * *